United States Patent [19]
Mori

[11] 4,439,484
[45] Mar. 27, 1984

[54] MULTI-LAYER BEARING WITH COATING OF TETRAFLUOROETHYLENE-PER-FLUOROALKYLVINYL EITHER COPOLYMER RESIN AND POLYTETRAFLUOROETHYLENE RESIN

[75] Inventor: Sanae Mori, Nagoya, Japan

[73] Assignee: Daido Metal Company Ltd., Nagoya, Japan

[21] Appl. No.: 404,673

[22] Filed: Aug. 3, 1982

[30] Foreign Application Priority Data

Aug. 12, 1981 [JP] Japan .................................. 56-126125

[51] Int. Cl.$^3$ ........................ B32B 15/00; B32B 27/00
[52] U.S. Cl. ......................... 428/318.4; 308/DIG. 8; 428/421; 428/422; 428/461
[58] Field of Search .......... 308/240, DIG. 8, DIG. 9; 428/421, 461, 422, 304.4, 550, 318.4; 427/376, 194

[56] References Cited

U.S. PATENT DOCUMENTS 4,128,693  5/1978  Dhami .................................. 428/422
4,208,472  6/1980  Cho ..................................... 428/422

Primary Examiner—Marion McCamish
Attorney, Agent, or Firm—Karl W. Flocks; Sheridan Neimark

[57] ABSTRACT

A multi-layer bearing including a metal backing layer and a porous material layer lined with the metal backing layer and impregnated in its interior and coated on its surface with a composition to increase the anti-cavitation, wear resistance and low friction characteristics of the multi-layer bearing. The composition contains, by volume, 0.1–50% tetrafluoroethylene-perfluoroalkylvinyl ether copolymer resin and the balance essentially polytetrafluoroethylene.

2 Claims, No Drawings

MULTI-LAYER BEARING WITH COATING OF TETRAFLUOROETHYLENE-PERFLUOROALKYLVINYL EITHER COPOLYMER RESIN AND POLYTETRAFLUOROETHYLENE RESIN

BACKGROUND OF THE INVENTION

This invention relates to improvements in or relating to multi-layer bearings.

One type of multi-layer bearing known in the art is disclosed in Japanese Patent Application Laid-Open No. 45440/79, for example. This multi-layer bearing will be described as an example to show the state of the art. The multi-layer bearing comprises a metal backing layer, and a porous material layer lined with the aforesaid metal backing layer, the porous material layer being impregnated in its interior and coated on its surface with a composition containing, by weight, 5–40% tetrafluoroethylenehexafluoropropylene copolymer resin (hereinafter FEP) and the balance being (60–95%) essentially polytetrafluoroethylene (hereinafter PTFE). The multi-layer bearing of this construction of the prior art has been found rather unsatisfactory in anti-cavitation, wear resistance and low friction characteristics which are very important characteristics for plain bearings. The anti-cavitation characteristic represents the property which, when separation of gas or production of vapor occurs in the lubricant and the gas or vapor vigorously exerts impact force on the sliding surface or end surface of the bearing, enables the sliding surface and end surface of the bearing to be free from damage, including wear, peeling and cracking, that might otherwise be caused. As subsequently to be described, a cavitation tester is used for determining the anti-cavitation characteristic of a bearing by measuring a loss of volume of the sliding surface or end surface of the bearing.

SUMMARY OF THE INVENTION

This invention has been developed for the purpose of obviating the aforesaid disadvantages of the prior art. Accordingly the invention has as its object the provision of a multi-layer bearing having improved anti-cavitation, wear resistance and low friction characteristics.

According to the invention, there is provided a multi-layer bearing comprising a metal backing layer, and a porous bearing material layer lined with said metal backing layer, said porous bearing material layer being impregnated in its interior, and coated on its surface with a composition containing, by volume, 0.1–50% tetrafluoroethylene-perfluoroalkylvinyl ether copolymer resin (hereinafter PFA) and the balance being essentially PTFE.

The outstanding characteristic of the invention is that PFA is used in place of the FEP used in multi-layer bearings of the prior art for impregnating and coating the bearing body of the multi-layer bearing. It has been ascertained by trial and error in experiments that PFA is superior to FEP in bonding ability to be adhered to PTFE which is the principal component of the composition and to the metal backing layer.

DETAILED DESCRIPTION OF THE INVENTION

As described in the summary of the invention, the multi-layer bearing according to the invention is characterized by a composition for impregnating and coating the porous material layer of the multi-layer bearing containing, by volume, 0.1–50% PFA. The reasons for setting the upper and lower limits of the amount of PFA at 50% and 0.1% respectively are as follows. When the amount of PFA is less than 0.1 volumetric percent, the bearing becomes markedly low in its anti-cavitation and wear resistance characteristics, with the result that the bearing cannot be put to practical use. If the amount of PFA exceeds 50 volume %, then PFA becomes the principal component of the composition and although the anti-cavitation and wear resistance characteristics of the bearing may be markedly improved, the coefficient of friction and the rise of temperature due to friction remarkably increases thereby the bearing performance is reduced in these respects. Thus 50 volume % has been selected as the upper limit.

An example of the invention will be described in detail as follows. A steel backing layer being plated with copper on its surface is further bonded with a porous bronze in powder form sintered thereon to provide a porous bronze layer on the steel backing layer. Then, the composition shown in Table 1 for impregnating and coating the porous bronze layer was applied to the multi-layer bearing and then passed between rolls to forcibly introduce the composition through pores of the porous bronze layer to have its interior permeated therewith and at the same time to apply a coat of the composition to the surface of the porous bronze layer. Thereafter the impregnated and coated porous bronze layer was baked at a temperature between the range of 27° and 400° C. and then passed between the rolls again to have its thickness rendered uniform. Thus articles of the prior art (specimens Nos. 1–4) and articles of the invention (specimens Nos. 5–8) were obtained.

Tests were conducted on these specimens. Tables 2 and 3 show test conditions and results of tests, respectively. Conditions specified for the friction and wear tests and the results of the tests are shown in Tables 4 and 5, respectively.

The metal backing layer according to the invention may be formed of any alternative metal other than steel. The plating of copper applied to the metal backing layer may be done without of plating of other alternative metal than copper or plating of an alloy may be applied thereto. The porous material layer formed on the metal backing layer may be formed of other metal or alloy than bronze or other alloys of the copper system.

The multi-layer bearing according to the invention has particular utility as a bearing adapted to be placed in a liquid or a bearing mounted in a position in which the bearing operates under conditions susceptible to cavitation. For example, the multi-layer bearing according to the invention may most advantageously be used with a shock-absorber.

The meritorious effects obtainable by the embodiment of the invention described hereinabove will be described.

When the articles of the prior art (specimens Nos. 1–4) are compared with the articles of the present invention (specimens Nos. 5–8) in such a manner that the articles of the same current of PFA and FEP are compared with each other or specimens Nos. 2, 3 and 4 are compared with specimens Nos. 6, 7 and 8 respectively, it will be seen that, as can be clearly seen in Tables 3 and 5, the articles of the present invention exhibit improvements over on those of the prior art or the articles of the present invention display about ½ or less of volumetric loss as compared with the articles of the prior art in the values of the loss of volume by cavitation, the amount of wear and the coefficient of friction of the bearing surface of the bearing. Moreover, a comparison of specimen No. 1 of the prior art with specimens Nos. 5-8 of the invention shows that the articles of the present invention are by far superior to the article of the prior art in anti-cavitation, wear resistance and low friction characteristics. It will thus be evident that the aimed object of the present invention has been accomplished.

TABLE 1

| Article | Specimen No | Impregnating and Coating Composition (Vol %) | | |
|---|---|---|---|---|
| | | PTFE | PFA | PEP |
| Prior Art | 1 | 100 | — | — |
| | 2 | 90 | — | 10 |
| | 3 | 80 | — | 20 |
| | 4 | 60 | — | 40 |
| Present Invention | 5 | 95 | 5 | — |
| | 6 | 90 | 10 | — |
| | 7 | 80 | 20 | — |
| | 8 | 60 | 40 | — |

TABLE 2

Test Conditions for Cavitation

| | |
|---|---|
| Used Testing Machine | Cavitation testing Machine |
| Measurements of Specimens Tested | 40 (length) × 40 (wide) × 1.5 (thickness) (mm) |
| Resonance Frequency | 19K Hz |
| Output Power | 600 W |
| Testing Liquid | Water |
| Temp. of Testing Liquid | Room temperature |
| Gap between Horn and Specimen | 1 mm |
| Amplitude of the Forward End of Horn | 45–50μ |
| Testing Time | 5 minutes |

TABLE 3

Results of Cavitation Tests

| Article | Specimen No. | Loss of Volume × $10^{-3}$ cm$^3$ |
|---|---|---|
| Prior Art | 1 | 8.5 |
| | 2 | 6.3 |
| | 3 | 4.5 |
| | 4 | 3.9 |
| Present | 5 | 3.7 |

TABLE 3-continued

Results of Cavitation Tests

| Article | Specimen No. | Loss of Volume × $10^{-3}$ cm$^3$ |
|---|---|---|
| Invention | 6 | 3.2 |
| | 7 | 2.8 |
| | 8 | 1.9 |

TABLE 4

Test Conditions for Friction and Wear

| | |
|---|---|
| Used Testing Machine | Friction and Wear Testing Machine of the Thrust Washer Type |
| Measurements of Specimens Tested | 40 (length) × 40 (wide) × 1.5 (thickness) (mm) |
| Load | 100 Kg/cm$^2$ |
| Peripheral Speed | 0.5 m/sec |
| Testing Time | 4 hours |
| Lubricant | Lubricant for Shock Absorbers |

TABLE 5

Results of Friction and Wear Tests

| Article | Specimen No. | Amount of Wear (μ) | Coefficient of Friction |
|---|---|---|---|
| Prior Art | 1 | 70 | over 0.1 |
| | 2 | 3.3 | 0.031 |
| | 3 | 1.5 | 0.018 |
| | 4 | 5.1 | 0.041 |
| Present Invention | 5 | 2.8 | 0.020 |
| | 6 | 1.8 | 0.015 |
| | 7 | 1.3 | 0.016 |
| | 8 | 2.7 | 0.020 |

What is claimed is:

1. A multi-layer bearing comprising:
a metal backing layer; and
a porous material layer lined with said metal backing layer, said porous material layer being impregnated in its interior, and coated on its surface with a composition containing, by volume, 0.1–50% tetrafluoroethylene-perfluoroalkylvinyl ether copolymer resin and the balance essentially polytetrafluoroethylene.

2. A multi-layer bearing as claimed in claim 1, wherein said composition contains, by volume, 5–40% tetrafluoroethylene-perfluoroalkylvinyl ether copolymer resin and the balance essentially polytetrafluoroethylene.

* * * * *